United States Patent [19]
Agar

[11] 3,763,692
[45] Oct. 9, 1973

[54] MEASURING OF FLUID DENSITY
[75] Inventor: Joram Agar, Hampshire, England
[73] Assignee: Joram Agar & Company Limited, Hampshire, England
[22] Filed: Apr. 5, 1972
[21] Appl. No.: 241,470

Related U.S. Application Data
[63] Continuation of Ser. No. 744,711, July 15, 1968, abandoned.

[30] Foreign Application Priority Data
July 26, 1967 Great Britain............ 34,378/67

[52] U.S. Cl. ............................................ 73/32
[51] Int. Cl. .................................... G01n 9/00
[58] Field of Search.......................... 73/30, 32

[56] References Cited
UNITED STATES PATENTS
3,516,283   6/1970   Abbotts ........................... 73/32 X

*Primary Examiner*—Richard C. Queisser
*Assistant Examiner*—Arthur E. Korkosz
*Attorney*—John W. Logan, Jr.

[57] ABSTRACT

The density of a fluid is measured employing apparatus including a cylinder immersed in the fluid, together with driving and pick-up means operating to resonate the cylinder at its natural frequency as affected by the fluidic medium; the apparatus described has the drive and pick-up coils located external to the resonating cylinder so that they are free of the fluidic medium.

15 Claims, 5 Drawing Figures

INVENTOR.
JORAM AGAR

BY *David E. Hopper*

ATTORNEY

MEASURING OF FLUID DENSITY

This is a continuation of application, Ser. No. 744,711, filed July 15, 1968, now abandoned.

This application calims the priority date of July 26, 1967, on the basis of British Application, Ser. Number 34378/67.

This invention concerns a method of, and apparatus for measuring the density of a fluid.

Accurate measurement of the density of a fluid is essential in a number of different fields of technology, e.g. in metering fluids like natural gas, or steam, or aircraft fuel, or in blending operations in food technology, gas chromatography, bio-chemistry and many other fields.

According to the present invention there is provided a method of measuring the density of a fluid, said method including passing the fluid through the interior of a hollow body mounted within a rigid support member, locating drive means and detecting means externally around, but out of contact with, said body, passing some of said fluid around the outside of said body in contact therewith, but out of contact with said drive means and with said detecting means so as substantially to equalise the fluid pressures acting on said body, exciting the said body by said drive means to vibrate at a resonant frequency whereby to generate in said detecting means a signal which is, in operation, frequency-modulated in dependance upon the density of said fluid passing through said body, and monitoring said signal.

Preferably, said drive means in operation excites the said body to vibrate in a circumferential mode of vibrations.

In one preferred embodiment, both said drive means and said detecting means are electromagnetic means located around the exterior of said body such that, in operation, the flux paths thereof substantially do not overlap each other and respectively extend into said body over only a small region thereof relative to the length of said body so as to reduce cross-coupling between said drive means and said detecting means.

Alternatively, the vibrations of said body may be excited electrostatically; or, in a further alternative, the vibrations of said body may be excited electro-acoustically. Thus the vibrations may be excited piezo-electrically, or magneto-strictively.

According to another aspect of the present invention, there is provided apparatus for measuring the density of a fluid, said apparatus including a rigid support member within which is mounted a hollow body adapted to have said fluid passing through its interior, drive means for exciting said body to vibrate at a resonant frequency, detecting means for detecting a signal representative of the frequency of said vibrations, which signal is frequency-modulated in operation in dependence upon the density of said fluid, said drive means and said detecting means being so mounted on said support member as to allow said fluid to pass externally around said body in contact therewith, but out of contact with said drive means and said detecting means, and monitoring means for monitoring said signal.

Said body is preferably a tube and may be of substantially circular cross-section. Moreover, said body may be provided at each end thereof with flanges so as to render said body substantially dumb-bell shaped.

In a preferred embodiment, said flanges are provided with apertures through which said fluid may pass externally around said body.

Both said drive means and said detecting means may be electromagnetic means located around the exterior of said body such that, in operation, the flux paths thereof substantially do not overlap each other and respectively extend into said body over only a small region thereof relative to the length of said body so as to reduce cross-coupling between the said drive means and the said detecting means.

In an alternative, said drive means and said detecting means may respectively be constituted by electroacoustic transducers for vibrating the said body.

In a futher alternative, said drive means and said detector means may be capacitor plates, the said body constituting the other plate for the drive capacitor and for the detector capacitor for the electrostatic excitation of vibrations in said body.

Preferably there is provided a locating pin for connecting said support member to the said body such that removal and replacement of said body may be effected without re-adjusting the relative positions of the said body and the said support member.

A core may be provided within the interior of the body so as to reduce the cross-sectional area of fluid flow therewithin.

Said support member may be provided with an end portion engageable with an adaptor mounted on a handle for use of the apparatus in relatively inaccessible locations.

Preferably, said support member is a rigid casing surrounding said body along at least the major part of the length of said body.

Filter means are preferably provided for filtering the fluid prior to its passing in contact with said body.

The invention will be described, merely by way of example, with reference to the accompanying drawings, in which.

Figure 1:
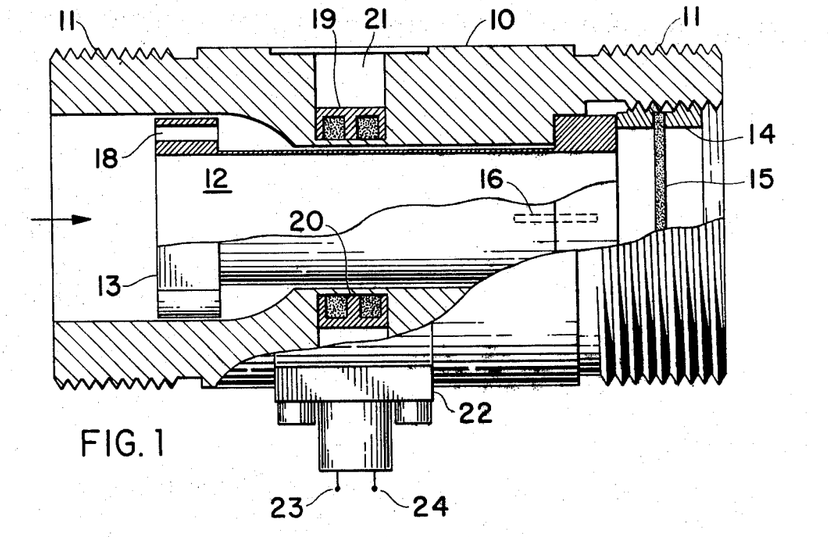
FIG. 1 is a side view, partly in section, of the apparatus for measuring the density of a fluid in accordance with the present invention.
Figure 2:
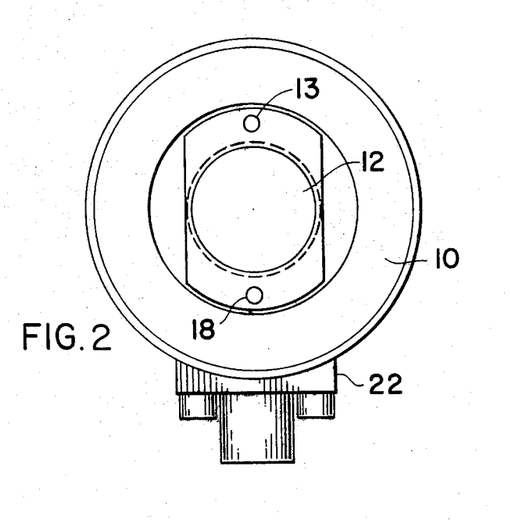
FIG. 2 is an end view of the apparatus shown in FIG. 1.

Referring first to FIGS. 1 and 2, there is shown an apparatus for measuring the density of fluid which comprises a rigid, hollow, cylindrical casing 10 having threads 11 at both its ends for fitting to a pipe-line or other location where the density of a fluid is to be measured. The casing 10 completely surrounds a substantially cylindrical thin-walled body 12 mounted within its interior with a gap therebetween, the said body 12 being also hollow and of circular internal cross-section. Each end of the body 12 is formed with a flange 13 so as to give the body 12 a substantially dumb-bell shape. Whereas the rigid casing 10 is made of a non-magnetic material such as aluminium or stainless steel, the body 12, hereafter referred to as sensing element 12, is made of a magnetic material which exhibits only small variations in natural frequency with changes of temperature.

One such material is sold under the Trade Name ELINVAR.

As can be seen, the sensing element 12 is mounted within the rigid casing 10 by means of lock-rings 14 between which is mounted a filter element 15. The sensing element 12 is thereby readily detachable from the casing 10. FIG. 2 also shows clearly that the flanges 13 are part-annular and not fully annular.

In order to ensure that the sensing element 12 and the rigid casing 10 are accurately positioned with respect to each other, a lock pin 16 is provided to interconnect the sensing element 12 and the casing 10 which pin 16 engages in an appropriate aperture formed in the sensing element 12. In this way it is ensured that repeated removal of the sensing element 12, e.g. for cleaning purposes, and consequently the repeated replacement thereof within the casing 10 will not necessitate asjustment of the remainder of the apparatus described below.

It will be appreciated that when, in operation, one end of the casing 10 is exposed to fluid flow, the fluid will enter into the interior of the sensing element 12, and owing to the part-annular shape of the flanges 13, fluid will also flow around the sensing element 12 within the casing 10 and through the said gap. Thus, in operation, the fluid pressures acting on the thin cylindrical wall of the sensing element 12 will be equal. If it is desired to make the flanges 13 fully annular, apertures 18 may be provided therein to allow circulation of the fluid outside the sensing element 12.

Mounted at approximately the mid-portion of the casing 10 are two coils 19, 20. As can be seen, in the radial plane of the coils 19, 20, which are off-set from each other by 180°, the casing 10 is very thin, so that the coils are as near as possible to the sensing element 12, yet the thin annular portion of the casing 10 will ensure that the fluid flow within and around the sensing element 12 is always out of contact with the coils 19 and 20. As seen in the drawings, the windings of the coil are in a plane substantially at right angles to the plane of the drawing, and the core of the coil has three poles. This arrangement ensures that when these coils are connected in an appropriate electrical circuit, the flux paths therefrom do not overlap each other, and extend into the sensing element 12 over only a very small portion thereof compared to the total length of the sensing element 12 whereby to reduce or eliminate cross-coupling between the coils 19 and 20. The coil 19 may be a drive coil and the coil 20 may be a detector or pick-up coil and they are arranged and maintained in operation at a 90° phase difference which results in an arrangement in which viscosity effects are substantially reduced or eliminated.

The coils 19 and 20 are secured in place of the casing 10 by means of a filler element 21.

Mounted on the exterior of the casing 10 is an amplifier 22 to which are electrically connected both the drive coil 19 and the detector coil 20. The amplifier 22 itself is connected to a small d.c. power source 23, e.g. a 12 volt battery, and the output circuit of the amplifier is connected to a frequency meter 24.

The operation of the apparatus is as follows:

The rigid casing 10 with the sensing element 12 securely mounted therein is exposed to fluid flow passing therethrough. With the power source 23 connected to the amplifier 22, natural resonant vibrations will be set up and maintained in the sensing element 12 by virtue of feed-back from the drive coil 19 to the detector or pick-up coil 20. The vibrations are initiated by mechanical noise transmitted to the sensing element 12 or by electrical noise occurring in the drive coil 19 when the amplifier 22 is switched into action. The end flanges 13 of the sensing element 12 will act as nodes for the vibrations of the sensing element 12 and in a preferred embodiment, these vibrations are in the circumferential mode of vibrations, that is to say they are natural bell-like vibrations. Naturally, the frequency of the current supplied to the drive coil 19 is substantially the same as the predominant frequency of the resonant vibrations of the sensing element 12.

The frequency meter 24 may be of any conventional design capable of covering the range of predominant frequencies anticipated for the operation of the apparatus, and may be calibrated to read directly in units of density from a graph previously calibrated and prepared through the use of fluids of standard or known densities.

In view of the fact that the pressure of the fluid across the cylindrical wall of the sensing element 12 is substantially equalised, the frequency of vibrations of the sensing element 12 is dependent primarily upon the density of the fluid flowing therethrough, the temperature effect being rendered substantially small or negligible by the use of the material of the sensing element 12 having a very low coefficient of thermal elasticity.

In fact, the materials of the casing 10 and the sensing element 12 are so chosen that operational pressures of up to 10,000 p.s.i. are acceptable.

It will be appreciated that when the sensing element 12 is set in oscillation in the circumferential mode, and maintained in oscillation by the amplifier 22, the fluid, the density of which is to be measured, is set in oscillation both on the inside and on the outside of the sensing element, and therefore the frequency of oscillation of the sensing element depends on its stiffness and the total oscillating mass, i.e. the walls of the sensing element and of the surrounding fluid. An increase in the density of the fluid lowers the frequency of oscillation which is monitored by the frequency meter 24. The actual relation is easily derivable by theory and it is given below.

$$(f_D/f_o)^2 = (1/1 + (D/K))$$

where $f_D$ is the frequency at density $D$, $f_o$ is the frequency at zero density (vacuum) and $K$ is a constant depending on the diameter and thickness of the wall of the sensing element 12.

The arrangement of the drive means and the detector means of the illustrated embodiment has a number of very important advantages. Firstly, by locating the coils or electo-mechanical drivers out of contact with the fluid, the density of which is to be measured, the safety of the operation of the device is enhanced. Clearly if the fluid in question is an ignitable gas or liquid, the importance of having the coils out of contact cannot be overstressed.

The arrangement of the straight-through flow is helpful in avoiding any dirt or other obstacle being entrapped and also the sensing element 12 can be easily removed for cleaning and inspection. This might well be a very important consideration when the apparatus according to the present invention is used in the food industry. Clearly the straight-through flow is also made possible by the fact that the coils are located outside of the sensing element 12.

The present invention also avoids the use of solenoids for driving the vibrations because that gives rise to long magnetic flux paths and dictates that the pole pieces must be in close proximity of the sensing element. This is a source of unreliable operation, since this small spacing acts as a trap for moisture and iron dust, which are practically impossible to eliminate and which in time will stop the vibration of the sensing element.

The flux pattern of the E-type coils of the present invention is such that this path is very short and the gap therefore can be increased between the coil and the sensing element itself. This enables the metering of fluids of high viscosity, and a much longer period of trouble-free operation.

Yet a further advantage of the illustrated embodiment is a gain in accuracy and the independence of the frequency of oscillation of variations in viscosity of the fluid being measured. In some arrangements using solenoids, because of the long uncontrolled flux paths between the two coils, inevitably a certain amount of flux linking will occur. The amount of flux linked depends upon the permeability of the sensing element which is temperature-dependent. Hence the overall phase shift and frequency of oscillation will vary with temperature, and particularly so with high viscosity fluids. By shortening the flux paths and substantially avoiding cross-coupling this defect is substantially eliminated.

A further important advantage in maintaining the phase shift accurate is the avoidance of "mode jumping." By "mode jumping" is meant the vibration of the system occurring at not only the fundamental harmonic frequency, but also at the higher harmonics. The higher the tendency of the system to jump modes, the lower is the useful range of the instrument. Thus, in the present invention, by reducing "mode jumping," a much larger change in operation of the frequency of oscillation may be tolerated.

A still further advantage is that the materials of the apparatus are so chosen that the apparatus has a high mechanical Q thereby rendering it substantially immune to vibration and allowing it to be mounted in any position.

The apparatus may be fitted to a pipe line in a matter of minutes and it is very easy to attach or detach. It offers very little resistance to flow and because of the amplitude of the vibrations is very small, quite considerably large bubbles in liquids can be tolerated.

Figure 3:
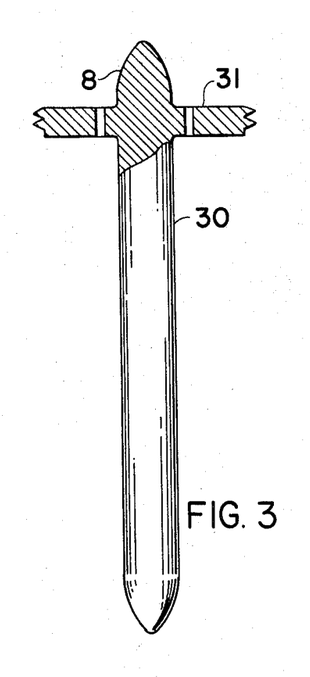
FIG. 3 is a core member usable in conjunction with the apparatus shown in FIG. 1 in certain applications.

In certain applications, such as gas chromatography, and biochemistry, it may be desired to reduce the volume of the fluid flow within the sensing element. This may be achieved by the use of a core member 30 such as is shown in FIG. 3. As can be seen the core member 30 is provided at one end with an annular flange 31 to replace a lock ring 14. The flange 31 is provided at its radially outer end with threads for mounting centrally within the interior of the sensing element 12.

Figure 4:
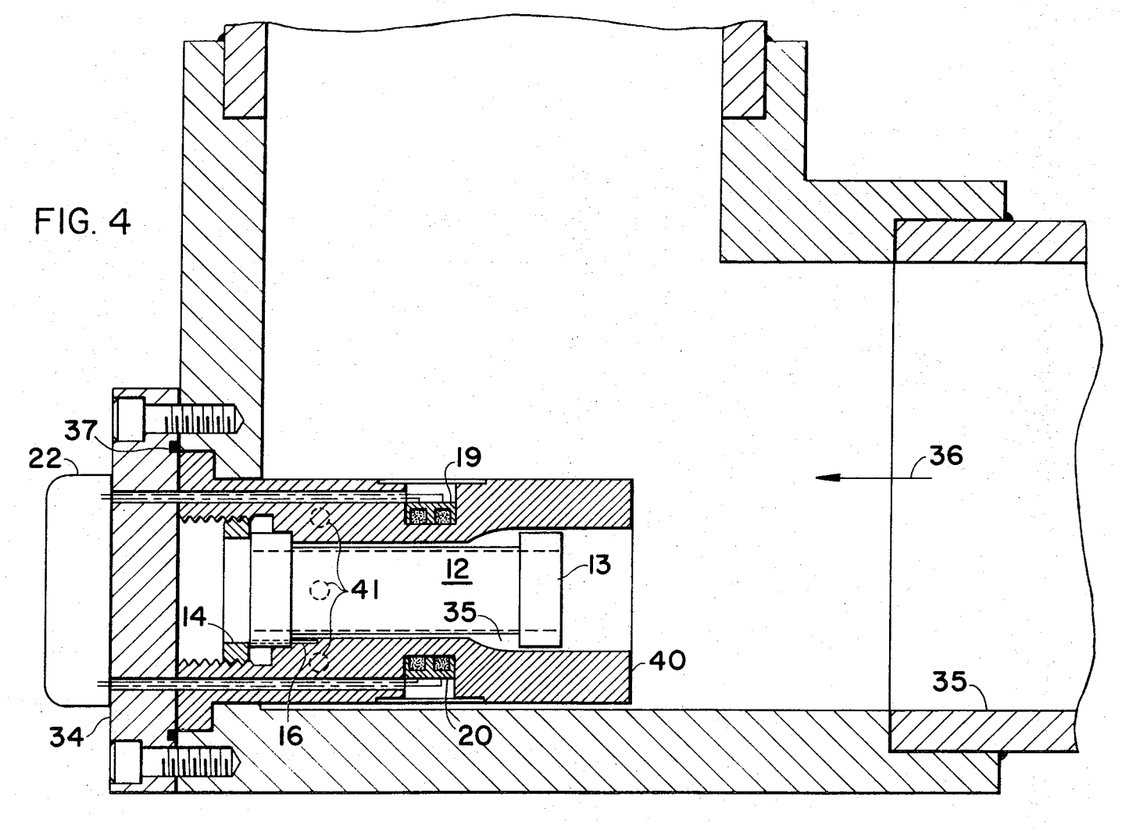
FIG. 4 is a view somewhat similar to FIG. 1, but showing a modified form of the apparatus fitted into an elbow of a fluid pipe line.

Referring now to FIG. 4, there is shown a pipe line 35 having an elbow bend therein, the flow of fluid being shown by a large arrow 36. The density measuring apparatus is substantially similar to that shown in FIG. 1, and like parts have been allotted like reference numbers. It will be observed that the apparatus is fitted within the pipe line 35 by means of a flange 34 which is attached to the pipe line by means of two capscrews 38 which are internally undercut to accommodate a sealing ring 37. The flange 34 has the amplifier 22 secured thereto, the power source 23 and the frequency meter 24 not being shown on this Figure.

In this embodiment, however, instead of a fully annular rigid casing 10, there is provided a substantially fork-shaped support member 40 which is not annular and merely serves to mount the sensing element 12 and the coils 19 and 20. As can be seen the leads from the coils pass through bores in the fork-shaped support member 40 and similarly pass through with aligned bores in the flange 34.

The inlet end of the apparatus is provided with a gauze element 35. The fluid penetrating into the interior of the sensing element 12 passes completely through the element and then passes round the outside thereof to leave through a plurality of holes or slots 41. Similarly, the fluid passing around the outside of the sensing element 12 returns into the pipeline 35 through those holes or slots 41.

Figure 5:
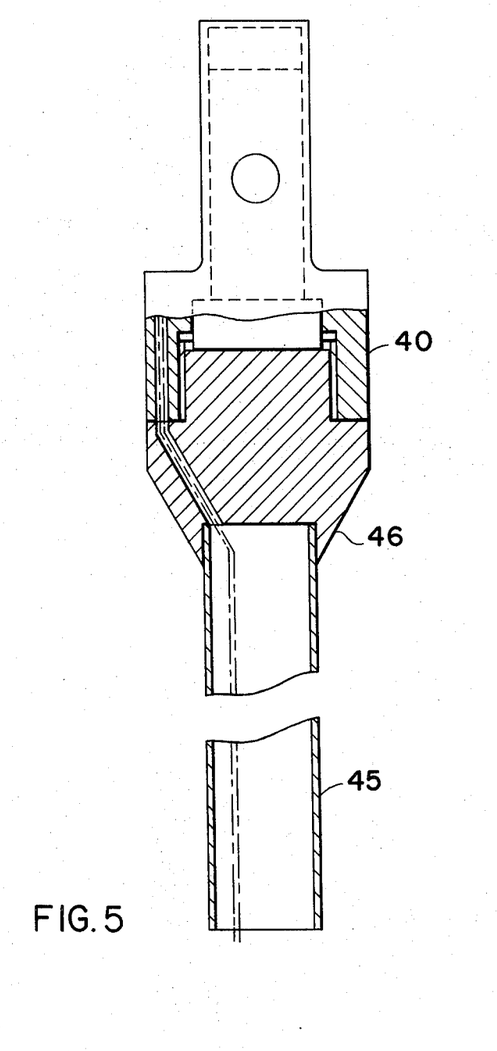
FIG. 5 is a side view, partly in section, of the apparatus shown in FIG. 1, but modified to be used as a probe.

Turning now to FIG. 5, there is shown a further embodiment of the present invention adapted to be used as a probe, e.g. in large tanks of liquids where the density may change with depth. To this end, the apparatus is mounted on a long handle 45 which is secured into an adaptor 46. To the other end of the adaptor 46 is secured the fork-shaped support member or casing 40. For the remainder, the apparatus is substantially similar to that shown in FIG. 4, and it will be seen that the fork-shaped support member 40 is provided with bores to allow the leads from the coils to pass to the amplifier 22 *via* the hollow interior of the handle 45.

The present invention has so far been described with reference to an electro-magnetic drive and detector means and the sensing element 12 being made of a magnetic material. However, it will be perfectly clear that other drive means and detector means may be used. Thus the sensing element 12 may be driven piezoelectrically or magneto-strictively and in general any electro-acoustic transducer may be used to drive it, in which case the sensing element may well be made of glass or other such material adapted to vibrate in response to the electro-acoustic excitement. In a further alternative, the drive may be effected by electrostatic means, in which case the drive and the detector means may be constituted by plates for a capacitative drive, the sensing element 12 itself constituting the other plate for the capacitors.

While in the above description the sensing element 12 has been described as a substantially cylindrical tube, its internal cross-section need not necessarily be circular but may have other shapes.

What I claim is:

1. Apparatus for measuring the density of a fluid, said apparatus including a hollow rigid support member of substantial thickness at one section thereof within which with a gap therebetween there is mounted a hollow body having open opposite ends and adapted to have said fluid passing unimpeded straight through its unobstructed interior, external drive means for exciting said body from its exterior to vibrate at a resonant frequency, external detecting means for detecting from the exterior of the hollow body a signal representative of the frequency of said vibrations, the frequency of said signal in operation being dependent substantially only upon the density of said fluid, said external drive means and said external detecting means being disposed in a recess in said section of substantial thickness of the hollow support member thereby isolating said drive and detecting means from said fluid and allowing a portion of said fluid to pass externally around the exterior of said hollow body through said gap and in contact therewith, but out of contact with said external drive means and said external detecting means, and monitoring means for monitoring said signal.

2. Apparatus as in claim 1 wherein said hollow body is a tube.

3. Apparatus as in claim 1 wherein said hollow body is of substantially circular cross-section.

4. Apparatus as in claim 1 wherein said hollow body is provided at each end thereof with flanges so as to render said body substantially dumb-bell shaped, whereby to allow said body to be clamped at said flanges without affecting the frequency of oscillation of the body.

5. Apparatus as in claim 4 wherein said flanges are provided with apertures through which said fluid may pass externally around said hollow body.

6. Apparatus as in claim 1 wherein both said external drive means and said external detecting means are electomagnetic coil means located around the exterior of said hollow body and disposed to substantially prevent the flux paths thereof from overlapping each other and which flux paths are caused to repectively extend into the exterior of said hollow body over only a small region thereof relative to the circumference of said body to reduce cross-coupling between the said external drive means and the said external detecting means, the electromagnetic coil means being 90° out of phase with each other and being arranged in planes at right angles to the axis of said hollow body.

7. Apparatus as in claim 1 wherein said external drive means and said external detecting means are respectively constituted by electro-acoustic transducers for vibrating the said hollow body.

8. Apparatus as in claim 1 wherein said external drive means and said external detector means are capacitor plates, the exterior of said hollow body constituting the other plate for the drive capacitor and for the detector capacitor for the electrostatic excitation of vibrations in said hollow body.

9. Apparatus as in claim 1 wherein there is provided a locating pin for connecting said support member to the said hollow body such that removal and replacement of said body may be effected without re-adjusting the relative positions of the said hollow body and the said support member.

10. Apparatus as in claim 1 wherein a core is provided within the interior of the hollow body so as to reduce the cross-sectional area of fluid flow therewithin.

11. Apparatus as in claim 1 wherein said support member is provided with an end portion engageable with an adaptor mounted on a handle for use of the apparatus in relatively inaccessible locations.

12. Apparatus as in claim 1 wherein said support member is a rigid casing surrounding said hollow body along at least the major part of the length of said hollow body.

13. Apparatus as in claim 1 wherein filter means are provided for filtering the fluid prior to its passing in contact with said hollow body.

14. Apparatus for measuring the density of a fluid, comprising a hollow rigid tubular support member through which said fluid is adapted to flow, a hollow tubular body positioned within said support member, said tubular body having an unobstructed interior and open opposite ends permitting substantially unimpeded flow of fluid therethrough, means mounting said tubular support member, said mounting means permitting flow of said fluid within said support member and exteriorly of said tubular body so that said fluid is in contact with and flows across the inner and outer surfaces of said tubular body, external drive means for exciting said tubular body from its exterior to vibrate at a resonant frequency, external detecting means for detecting from the exterior of said tubular body a signal representative of the frequency of said vibrations, the frequency of said signal being dependent upon the density of said fluid, means mounting said drive means and said detecting means at spaced locations exteriorly on said support member and isolated from said fluid, and monitoring means for monitoring said signal.

15. Apparatus as in claim 14 in which said tubular support member has a section thereof of generally cylindrical form and said hollow body is of generally cylindrical form mounted within said cylindrical section of said support member and spaced uniformly from the inner walls of said support member, and wherein said drive means and said detecting means are mounted on the exterior of the cylindrical section of said support member.

* * * * *

UNITED STATES PATENT OFFICE
CERTIFICATE OF CORRECTION

Patent No. 3,763,692                             Dated October 9, 1973

Inventor(s)    Joram Agar

It is certified that error appears in the above-identified patent and that said Letters Patent are hereby corrected as shown below:

Column 3, line 18, change "asjustment" to --adjustment;
        line 51, after "difference" insert --between the driving force of coil 19 and the detected velocity of the change in the spacing of the element 12 and the detector coil 20--;
        line 61, before the period (.) insert --or a periodic time meter--.
Column 4, line 1, after "of" insert --the positive--;
        line 1, after "the", first occurrence, insert --detector of pick-up coil 20 to the--;
        lines 1 and 2, after "19" delete "to the detector or pick-up coil 20";
        line 6, after "12" insert --and--;
        line 6, change "the" to --its--;
        line 7, after "brations" insert a period (.) and delete "of the sensing element 12 and";
        line 7, change "in" to --In--;
Column 4, line 9, after "vibrations" change the comma (,) to a semi-colon (;)--;
        line 9, after "say" insert a comma (,)--;
        lines 9 and 10, after "say" delete --"they are natural bell-like vibrations."-- and insert --one may consider the sensing element 12 similar to two bells joined together and clamped at the nodal points (which are the flanges 13). As is well-known, clamping a bell at its stem does not affect its frequency of oscillation.--;
        line 30, change "of" to --e.g.--;
        line 45, after "=" delete the parenthesis ( );
        line 45, after "1/" insert parenthesis ( );
        line 45, before "D" delete parenthesis ( );
        line 45, after "K" delete the second parenthesis ( );

UNITED STATES PATENT OFFICE
CERTIFICATE OF CORRECTION

Patent No. 3,763,692  Dated October 9, 1973

Inventor(s) Joram Agar

It is certified that error appears in the above-identified patent and that said Letters Patent are hereby corrected as shown below:

Column 4, line 49, after "12" delete the period (.) and insert --, on the density of the material of the sensing element 12 and on the mode of vibration.--.
Column 5, line 3, after "invention" insert --, by using E-type or cup type coils, --;
        line 3, after "of" insert --that type of--;
        line 3, change "solenoids" to --solenoid--;
        line 4, delete "for driving the vibrations because that" and insert --as a driver which--;
        line 14, after "This" insert --factor is particularly useful in that it--;
        line 15, after "of" delete "fluids of high viscosity" and insert --liquids as well as gases--;
        lines 31 and 32, after "advantages" delete "in maintaining the phase shift accurate" and insert --accuring from the high efficiency of the drive and detecting system;
        lines 47 and 48, change "amplitude to --zone--.

Signed and Sealed this thirteenth Day of January 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,763,692　　　　　　　　　Dated October 9, 1973

Inventor(s)　　Joram Agar　　　　　　　Page 1 of 2

It is certified that error appears in the above-identified patent and that said Letters Patent are hereby corrected as shown below:

Column 3, line 18, change "asjustment" to --adjustment;
　　　　line 51, after "difference" insert --between the driving force of coil 19 and the detected velocity of the change in the spacing of the element 12 and the detector coil 20--;
　　　　line 61, before the period (.) insert --or a periodic time meter--.
Column 4, line 1, after "of" insert --the positive--;
　　　　line 1, after "the", first occurrence, insert --detector of pick-up coil 20 to the--;
　　　　lines 1 and 2, after "19" delete "to the detector or pick-up coil 20";
　　　　line 6, after "12" insert --and--;
　　　　line 6, change "the" to --its--;
　　　　line 7, after "brations" insert a period (.) and delete "of the sensing element 12 and";
　　　　line 7, change "in" to --In--;
Column 4, line 9, after "vibrations" change the comma (,) to a semi-colon (;)--;
　　　　line 9, after "say" insert a comma (,)--;
　　　　lines 9 and 10, after "say" delete --"they are natural bell-like vibrations."-- and insert --one may consider the sensing element 12 similar to two bells joined together and clamped at the nodal points (which are the flanges 13). As is well-known, clamping a bell at its stem does not affect its frequency of oscillation.--;
　　　　line 30, change "of" to --e.g.--;
　　　　line 45, after "=" delete the parenthesis ( );
　　　　line 45, after "1/" insert parenthesis ( );
　　　　line 45, before "D" delete parenthesis ( );
　　　　line 45, after "K" delete the second parenthesis ( );

UNITED STATES PATENT OFFICE
CERTIFICATE OF CORRECTION

Patent No. 3,763,692            Dated October 9, 1975

Inventor(s) Joram Agar

It is certified that error appears in the above-identified patent and that said Letters Patent are hereby corrected as shown below:

Column 4, line 49, after "12" delete the period (.) and insert --, on the density of the material of the sensing element 12 and on the mode of vibration.--.
Column 5, line 3, after "invention" insert --, by using E-tyle or cup type coils, --;
        line 3, after "of" insert --that type of--;
        line 3, change "solenoids" to --solenoid--;
        line 4, delete "for driving the vibrations because that" and insert --as a driver which--;
        line 14, after "This" insert --factor is particularly useful in that it--;
        line 15, after "of" delete "fluids of high viscosity" and insert --liquids as well as gases--;
        lines 31 and 32, after "advantages" delete "in maintaining the phase shift accurate" and insert --accuring from the high efficiency of the drive and detecting system;
        lines 47 and 48, change "amplitude to --zone--.

This certificate supersedes Certificate of Correction issued September 10, 1974.

Signed and Sealed this tenth Day of February 1976

[SEAL]

Attest:

RUTH C. MASON
*Attesting Officer*

C. MARSHALL DANN
*Commissioner of Patents and Trademarks*